Nov. 12, 1968  MIZURO ISHIZUKA  3,410,369
DAMPER CONSTRUCTION FOR DAMPING TORSIONAL VIBRATIONS
OF A REVOLVING BODY
Filed Feb. 7, 1966

United States Patent Office 3,410,369
Patented Nov. 12, 1968

3,410,369
DAMPER CONSTRUCTION FOR DAMPING TORSIONAL VIBRATIONS OF A REVOLVING BODY
Mizuro Ishizuka, Tokyo, Japan, assignor to Mitsubishi Jukogyo Kabushiki Kaisha, Tokyo, Japan
Filed Feb. 7, 1966, Ser. No. 525,672
Claims priority, application Japan, Sept. 8, 1965, 40/55,060
8 Claims. (Cl. 188—1)

ABSTRACT OF THE DISCLOSURE

A damper construction for damping torsional vibrations of a revolving body comprises an outer peripheral damper mass formed of first and second ring members which are interengaged. The ring members together define an intermediate annular groove and two groove portions of lesser diameter on each side of the annular groove. A damper fitting body of flat ring-shaped configuration is disposed between the damper ring members and extends peripherally into the intermediate groove. A viscous liquid is disposed in the intermediate groove and provides the frictional damping force. An elastic member is arranged on each side of the fitting body and is compressed between this fitting body and the adjacent walls of the groove portions on each side of the intermediate groove and provide a seal for the viscous liquid which extends into the intermediate groove around the damped fitting body.

In accordance with the method of the invention, the damper is formed using two mass ring parts, a central flat fitting body, and an elastic ring for each side of the fitting body, by orienting the elastic rings on each side of the fitting body and positioning the assembly within an end groove and an intermediate groove of the first damper mass ring. Thereafter, the second damper mass ring is pressed against the first damper mass ring and the elastic ring to compress both elastic rings and anchor the first and second damper mass rings together.

---

This application invention relates in general to the construction of a part subject to torsional stressing and to a method of making such part and in particular to a new and useful damper construction and to a method of effecting the same.

The invention has particular application for use in the construction of a damper for absorbing torsional vibrations of a rotated body such as with the crank shaft of an internal combustion engine. Prior to the present invention, a damper of this type was constructed such that a damper mass was fitted around the periphery of a damper fitting body with the interposition of an elastic element therebetween. Such an apparatus was very difficult to manufacture in view of the fact that the precise spacing between the fitting body and the damper mass was difficult to achieve and maintain and in addition it was difficult to form the elastic body between the two elements in a manner that would insure the stability of the parts in their proper fitting.

In accordance with the present invention a damper is provided which includes a damper mass which is advantageously made of two parts which may be fitted easily together over a fitted body with rings of elastic material disposed on each side of the fitting body and between the parts which are fitted together. In accordance with the method of the invention two elastic ring members are placed on each side of a damper fitting body which is of flat ring-shaped configuration and then compressed between two tightly fitting parts of the damper peripheral mass with the interposition of a viscous fluid between recesses defined between the parts of the damper mass and the elastic ring and fitting member.

In a preferred method, the ring members are advantageously arranged on each side of the damper fitting body and advantageously fixed in position such as by sealing, or other bonding. Thereafter, the assembled parts are oriented with the outer elastic ring in an interior groove defined on one of the damper mass parts and with the intermediate body extending into an intermediate groove. Thereafter a second damper mass element is fitted into a still third groove or recess defined in the first damper mass and the two damper mass parts are connected together.

In some instances the finished product advantageously includes a construction in which the parts are either press-fitted or welded together with, for example, the interposition of packing after the intermediate grooves of the two interfitting damper mass parts are filled with a viscous liquid.

In a still further embodiment of the invention more than one elastic ring member may be employed, preferably with an inner ring fitting into a ring of large diameter.

Accordingly it is an object of the invention to provide a damper including a damper fitting body having resilient rings on each side which are compressed between two damper mass parts.

A further object of the invention is to provide a method of constructing a damper by connecting a resilient ring member on each side of a fitting body and compressing the rings for tightly fitting two outer damper masses over the rings.

A further object of the invention is to provide a damper which is simple in design, rugged in construction and economical to manufacture.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 7:
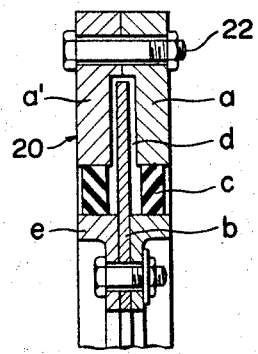
FIG. 7 is a view similar to FIG. 1 of the prior art construction.

Prior to the present invention a conventional damper generally designated 20, as indicated in FIG. 7, included outer peripheral damper mass parts $a$ and $a'$ which were bolted together by bolt means 22 around the periphery of a fitting body $b$ with the interposition of an elastic body or gum $c$ which was bound between the damper mass and the fitting body circumferential part $e$.

Figure 1:
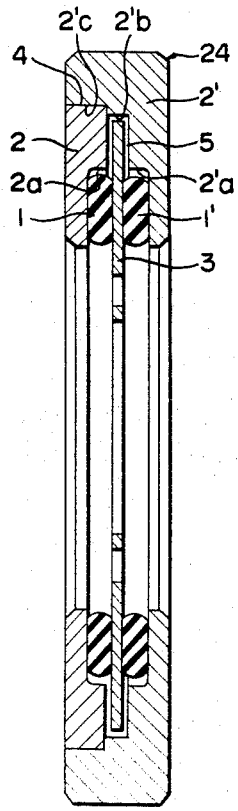
FIG. 1 is an axial sectional view of a damper constructed in accordance with the invention.
Figure 2:
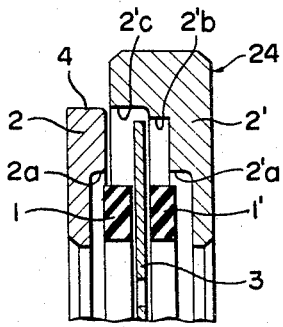
FIGS. 2 and 3 are partial views similar to FIG. 1 indicating separate methods of forming the damper ring construction.
Figure 3:
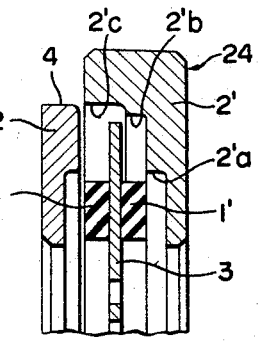

In accordance with the present invention a damper construction 24, as indicated in FIGS. 1 to 3, includes a damper mass or damper ring members made of two parts 2 and 2'. The damper mass part 2' includes a first inner ring portion $2a'$ and intermediate ring portion $2b'$, and an outer ring portion $2c'$. The complementary damper mass 2 includes an exterior diameter 4 substantially equivalent to the ring diameter $2c'$ and it is combined with the damper mass 2' such as by force fitting or by expansion fitting or the like. After combining the two parts of the damper mass, the mass surrounds the peripheral portion of a fitting body 3 with the interposition of a ring 1 and 1' on each side thereof which ride in grooves 2a' and 2a defined by the respective damper mass parts 2' and 2, respectively. The outer periphery of the damper fitting body 3 rides in the groove 2b' and viscous liquid 5 is arranged in the space around the periphery of the fitting body 3 and around the periphery of the ring portions 1 and 1'.

In FIG. 2 there is indicated a method of forming a damper mass 24 in which the parts including the fitting body 3 and the rings 1 and 1' are oriented together and then compressed between the two damper mass parts 2 and 2' which are then fitted thereover. In this manner the space filled by the viscous fluid 5 is hermetically sealed.

In the method indicated by the showing of FIG. 3, the damper fitting body 3 and the rings 1 and 1' are assembled together and are combined such as by bonding the rings to the body 3 with adhesive or by heat sealing or vulcanizing. With the parts thus aligned on the body 3, it is a simple matter to compress the parts 2 and 2' together over the rings 1 and 1'.

The damper 24 may advantageously be arranged so that the fitting body 3 is fitted to and rotated with a rotating body which performs torsional vibrations such as the crank shaft of an internal combustion engine. The torsional vibration can be diminished by the shearing torsional rigidity of the elastic bodies 1 and 1' and the viscous frictional resistance of the viscous fluid 5 enclosed hermetically between the damper mass parts 2 and 2'.

Because the space occupied by the viscous fluid 5 is determined by the dimensions of the damper mass parts 2 and 2', the space size does not fluctuate so that the value of the frictional resistance can always be kept constant unlike the prior art construction indicated in FIG. 7.

Because the two parts or ring elements 1 and 1' are compressed after assemblage, the strength of these elastic bodies increases so that the durability of the damper is prolonged. Because of the compression arrangement it is also possible to combine the parts together without heat sealing them or binding them in any way. Therefore, the parts can be easily manufactured and assembled with little difficulty and inexpensively.

Figure 4:
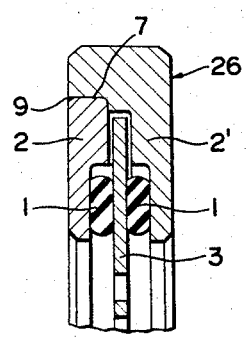
FIGS. 4, 5 and 6 are partial views similar to FIG. 1 of other embodiments of the invention.

In the embodiment indicated in FIG. 4, a damper 26 is provided which includes damper mass parts 2 and 2' as in the other embodiment. Instead of press fitting the parts together, they are provided with a packing 7 and held together such as by a weld 9.

Figure 5:
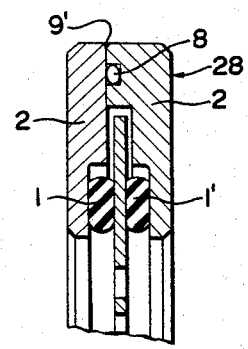

In the embodiment of FIG. 5, a damper 28 is provided which includes a flat surface interengagement between the damper mass parts 2 and 2'. The part 2' is provided with a groove carrying an O-ring 8. A weld 9' is applied at the outer end of the separating line between the parts 2 and 2'. This can be used for damper constructions which are relatively large and in which a sufficient forceful connection of the two parts 2 and 2' cannot be attained by force fitting the two parts with their outer rim of the one part 2 within the groove 2c' of the other part 2'.

Figure 6:
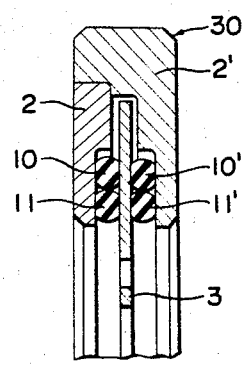

In the embodiment indicated in FIG. 6, there is shown a damper 30 which varies from the other embodiment by the provision of two elastic parts or ring members 10 and 11 and 10' and 11' arranged on each side of the intermediate fitting body 3. The ring members are advantageously circular in cross section as indicated in FIG. 6. By dividing the total ring construction required into two separate smaller ring elements, the compression load at the time of the connecting of the two parts can be diminished and the damper can be made smaller and assembled more easily.

While specific embodiments of the invention have been shown and described in detail to illustrate the application of the inventive principles, it will be understood that the invention may be embodied otherwise without departing from such principles.

What is claimed is:

1. A damper construction for damping torsional vibrations of a revolving body comprising an outer peripheral damper mass formed of first and second ring members which are interengaged, said ring members defining together an intermediate annular groove and two side groove portions of lesser diameter on each side of said intermediate annular groove, a damper fitting body of flat ring-shaped configuration disposed between said damper ring members and extending into the intermediate groove, a viscous liquid in the intermediate groove, and an elastic body on each side of said fitting body extending into the side groove portions on each side of said intermediate groove and in tight engagement with the walls of said fitting body and said first and second rings and sealing the intermediate groove on each side of said damper fitting body.

2. A damper according to claim 1, wherein said elastic body is flattened between said fitting body and said first and second ring of said damper mass.

3. A damper according to claim 1, wherein said elastic bodies are bonded to said damper fitting body.

4. A damper according to claim 1, wherein said first ring member includes an internal ring portion, said second ring member being force-fitted within said ring portion of said first ring member.

5. A damper according to claim 4, including a weld connecting said first and second ring members of said damper mass at their peripheries.

6. A damper according to claim 1, wherein said first and second damper ring members of said damper mass include flat interengaged end faces, one of said damper ring members having a groove in its interengaged face, and an O-ring compressed in said groove between said first and second ring members.

7. A damper according to claim 1, wherein said elastic body on each side of said fitting body includes two separate ring elements.

8. A damper according to claim 7, wherein two separate ring elements include a ring of smaller diameter arranged within the ring of larger diameter.

References Cited

UNITED STATES PATENTS

| 2,714,823 | 8/1955 | Dall et al. | |
| 2,736,393 | 2/1956 | O'Connor | 188—1 |
| 3,196,710 | 7/1965 | Peirce | 188—1 X |

DUANE A. REGER, *Primary Examiner.*